(12) United States Patent
Hilton et al.

(10) Patent No.: US 7,322,521 B2
(45) Date of Patent: *Jan. 29, 2008

(54) UNIVERSAL TICKET TRANSPORT

(75) Inventors: Graham H. Hilton, San Diego, CA (US); Paula Miller, San Diego, CA (US); Thomas Busch-Sorensen, San Diego, CA (US); Richard A. Pearson, San Diego, CA (US)

(73) Assignee: Cubic Corporation, San Diego, CA (US)

(*) Notice: Subject to any disclaimer, the term of this patent is extended or adjusted under 35 U.S.C. 154(b) by 0 days.

This patent is subject to a terminal disclaimer.

(21) Appl. No.: 11/367,053

(22) Filed: Mar. 2, 2006

(65) Prior Publication Data

US 2006/0175398 A1    Aug. 10, 2006

Related U.S. Application Data

(63) Continuation of application No. 10/989,360, filed on Nov. 15, 2004, now Pat. No. 7,036,732, which is a continuation of application No. 10/227,777, filed on Aug. 26, 2002, now Pat. No. 6,817,524.

(60) Provisional application No. 60/318,769, filed on Sep. 12, 2001, provisional application No. 60/314,564, filed on Aug. 24, 2001.

(51) Int. Cl.
 *G06B 15/02* (2006.01)
(52) U.S. Cl. .................................. 235/384; 235/449
(58) Field of Classification Search ................ 235/449, 235/487, 492, 493, 384
 See application file for complete search history.

(56) References Cited

U.S. PATENT DOCUMENTS 2,914,746 A    11/1959    James
(Continued)

FOREIGN PATENT DOCUMENTS

JP    2000118764 A    4/2000
(Continued)

OTHER PUBLICATIONS

Print out of web page "Machinery Directive (98/37/EC) and CE marking" at HTTP://www.euroconform.com/machinery.htm, downloaded on Aug. 5, 2002.

*Primary Examiner*—Daniel Stcyr
(74) *Attorney, Agent, or Firm*—Townsend and Townsend and Crew (57) ABSTRACT

A Universal Ticket Transport (UTT) 10, 150 may be configured to read from and write to many types of magnetically encoded tickets 20 currently used in fare collection systems. The UTT 10, 150 includes a mechanical insertion interface and automated movement along a transport path 18 for tickets 20 of varying thicknesses that are presented at a range of different angles 40, 42 into and exiting from the UTT 10, 150. The UTT 10, 150 includes a mechanical assembly 156, 158 which may be rotated, and the belts 22, 24, 152, 154 and rollers 30, 32, 34, 36 reconfigured, to accommodate tickets 20 having top-face or bottom face magnetic stripes. The belt subassemblies A, C and the magnetic head subassembly B are configurable across a width W of the UTT 10, 150 to process tickets 20 having magnetic stripes which are offset from a center line 86. The UTT 10, 150 includes a control processor 200 having analog to digital interfaces 216 and control logic 202, 204 for operating the transport mechanisms 212 locally and communicating data through a serial interface 220 to a host system 222.

10 Claims, 7 Drawing Sheets

U.S. PATENT DOCUMENTS

| | | |
|---|---|---|
| 3,087,724 A | 4/1963 | Snowdon et al. |
| 3,108,741 A | 10/1963 | Thomas |
| 3,139,278 A | 6/1964 | Maidment |
| 3,445,633 A | 5/1969 | Ratner |
| 3,501,622 A | 3/1970 | Weir et al. |
| 3,533,084 A | 10/1970 | Cook et al. |
| 3,537,393 A | 11/1970 | Hegi |
| 3,595,565 A | 7/1971 | Bergland |
| 3,622,995 A | 11/1971 | Dilks et al. |
| 3,626,158 A | 12/1971 | Lawrence |
| 3,651,503 A | 3/1972 | Kono |
| 3,668,654 A | 6/1972 | Doersam, Jr. |
| 3,688,276 A | 8/1972 | Quinn |
| 3,705,396 A | 12/1972 | Nagaki et al. |
| 3,734,011 A | 5/1973 | Williams |
| 3,748,441 A | 7/1973 | Halpern |
| 3,749,398 A | 7/1973 | Fujita et al. |
| 3,750,103 A | 7/1973 | Angus et al. |
| 3,760,164 A | 9/1973 | Kral |
| 3,777,120 A | 12/1973 | Menger et al. |
| 3,825,950 A | 7/1974 | Kobayashi et al. |
| 3,841,550 A | 10/1974 | Kaneda et al. |
| 3,859,507 A | 1/1975 | Konya |
| 3,870,866 A | 3/1975 | Halpern |
| 3,899,971 A | 8/1975 | Dudley |
| 3,918,700 A | 11/1975 | Donner |
| 3,921,516 A | 11/1975 | Toft et al. |
| 3,926,019 A | 12/1975 | Mazeika |
| 3,931,497 A | 1/1976 | Gentile et al. |
| 3,931,761 A | 1/1976 | Carrus et al. |
| 3,941,977 A | 3/1976 | Voss et al. |
| 3,943,335 A | 3/1976 | Kinker et al. |
| 3,949,501 A | 4/1976 | Andrews et al. |
| 3,951,061 A | 4/1976 | Bremmer et al. |
| 3,958,103 A | 5/1976 | Oka et al. |
| 3,984,660 A | 10/1976 | Oka et al. |
| 3,997,917 A | 12/1976 | Kihara |
| 4,020,326 A | 4/1977 | Coulthurst et al. |
| 4,023,013 A | 5/1977 | Kinker |
| 4,031,359 A | 6/1977 | Christou et al. |
| 4,036,430 A | 7/1977 | Eppich |
| 4,040,345 A | 8/1977 | Adams et al. |
| 4,043,440 A | 8/1977 | Busch |
| 4,074,352 A | 2/1978 | Cook et al. |
| 4,079,354 A | 3/1978 | Nitta |
| 4,085,313 A | 4/1978 | Van Ness |
| 4,109,238 A | 8/1978 | Creekmore |
| 4,181,920 A | 1/1980 | Cerekas |
| 4,211,498 A | 7/1980 | Shimuzu et al. |
| 4,223,885 A | 9/1980 | Templeton |
| 4,247,759 A | 1/1981 | Yuris et al. |
| 4,251,000 A | 2/1981 | Templeton |
| 4,357,530 A | 11/1982 | Roes et al. |
| 4,372,478 A | 2/1983 | Gomez |
| 4,377,828 A | 3/1983 | Hayman et al. |
| 4,449,186 A | 5/1984 | Kelly et al. |
| 4,471,905 A | 9/1984 | Sloma et al. |
| 4,488,035 A | 12/1984 | Withnall et al. |
| 4,605,843 A | 8/1986 | Aubrey et al. |
| 4,640,505 A | 2/1987 | Placke et al. |
| 4,732,375 A | 3/1988 | Tetherton |
| 4,798,942 A | 1/1989 | Aubrey |
| 4,866,661 A | 9/1989 | de Prins |
| 4,868,376 A | 9/1989 | Lessin et al. |
| 4,909,648 A | 3/1990 | Hartman |
| 4,977,502 A | 12/1990 | Baker et al. |
| 4,981,378 A | 1/1991 | Kramer |
| 4,982,337 A | 1/1991 | Burr et al. |
| 5,062,722 A | 11/1991 | Shiozaki |
| 5,066,153 A | 11/1991 | Stephens |
| 5,092,697 A | 3/1992 | McKenna |
| 5,133,615 A | 7/1992 | Saito et al. |
| 5,159,350 A | 10/1992 | Minnaminaka |
| 5,191,195 A | 3/1993 | Aubrey |
| 5,215,383 A | 6/1993 | Hilton |
| 5,298,726 A | 3/1994 | Aubrey |
| 5,331,138 A | 7/1994 | Saroya |
| 5,362,951 A | 11/1994 | Kanazawa |
| 5,376,999 A | 12/1994 | Hwang |
| 5,594,233 A | 1/1997 | Kenneth |
| 5,650,761 A | 7/1997 | Gomm et al. |
| 5,679,945 A | 10/1997 | Renner |
| 5,704,046 A | 12/1997 | Hogan |
| 5,720,376 A | 2/1998 | Polidoro et al. |
| 5,734,722 A | 3/1998 | Halpern |
| 5,748,737 A | 5/1998 | Daggar |
| 5,832,090 A | 11/1998 | Raspotnik |
| 5,856,659 A | 1/1999 | Drupsteen et al. |
| 5,859,419 A | 1/1999 | Wynn |
| 5,892,211 A | 4/1999 | Davis et al. |
| 5,917,177 A | 6/1999 | Owa |
| 5,936,221 A | 8/1999 | Corder et al. |
| 5,949,058 A | 9/1999 | Kimura |
| 5,965,862 A | 10/1999 | Momose |
| 6,014,748 A | 1/2000 | Tushie et al. |
| 6,018,717 A | 1/2000 | Lee et al. |
| 6,029,892 A | 2/2000 | Miyake |
| 6,062,472 A | 5/2000 | Cheung |
| 6,085,976 A | 7/2000 | Sehr |
| 6,164,538 A | 12/2000 | Furnya et al. |
| 6,168,077 B1 | 1/2001 | Gray |
| 6,196,459 B1 | 3/2001 | Goman et al. |
| 6,202,155 B1 | 3/2001 | Tushie et al. |
| 6,213,392 B1 | 4/2001 | Zuppicich |
| 6,223,984 B1 | 5/2001 | Renner |
| 6,250,552 B1 | 6/2001 | Hirasawa |
| 6,317,832 B1 | 11/2001 | Everett et al. |

FOREIGN PATENT DOCUMENTS

| | | |
|---|---|---|
| WO | WO00/79487 A1 | 12/2000 |

UNIVERSAL TICKET TRANSPORT

CROSS-REFERENCES TO RELATED APPLICATIONS

This application is a continuation of U.S. patent application Ser. No. 10/989,360, filed Nov. 15, 2004, now U.S. Pat. No. 7,036,732 which is a continuation of U.S. patent application Ser. No. 10/227,777, filed Aug. 26, 2002, now U.S. Pat. No. 6,817,524, which claims the benefit of priority under 35 U.S.C. 119(e) to provisional U.S. Patent Application No. 60/314,564 filed Aug. 24, 2001, and provisional U.S. Patent Application No. 60/318,769 filed Sep. 12, 2001, all of which are incorporated herein by reference in their entirety.

FIELD OF THE INVENTION

This invention relates generally to card and ticket readers, and more specifically to an electromechanical universal ticket transport assembly designed to handle reading and writing of magnetically encoded cards and tickets of various formats.

BACKGROUND OF THE INVENTION

Magnetic stripe technology is used throughout the world for identification (ID) and credit/debit transaction processes. Other technologies which can store more information, such as contact and contactless smart cards, continue to capture more of the magnetic stripe market as systems are upgraded. However, magnetic stripe cards, or tickets, remain a dominant technology, particularly for systems which have been in operation for a substantial time, such as mass transit systems.

Most fare collection systems of mass transit systems throughout the world accept credit card size magnetic stripe tickets. The ticket material and thickness, the location of the magnetic stripe, as well as the magnetic stripe format, vary from system to system. The most common design, conforming to the ISO standard, ISO-7810, entitled "Identification Cards—Physical Characteristics", specifies the location of a single magnetic stripe. However, many mass transit authorities have customized tickets to avoid cross-use of tickets from one transit system to another. Customization of tickets may include variations on the number and the location of magnetic stripes. One or more magnetic stripes may be located on the front and back faces of the card. The magnetic stripe may be located in the center of the card, or offset to either side of center. Examples of tickets currently in use in transit systems throughout the world include a ticket configuration of a single magnetic stripe in a center position on the ticket back face, a single magnetic stripe offset on the ticket front face, and two magnetic stripes offset from the center on the ticket back.

In addition to location and number of magnetic stripes, tickets may vary in the type of magnetic media which ranges from low to high coercivity. Coercivity is a technical term used to designate the strength of a magnetic field required to affect data encoded on a magnetic stripe. Cards that are used in daily transactions typically have a high coercivity to provide the highest level of immunity to damage by stray magnetic fields. A further variation is in the track configuration of each magnetic stripe. For example, ANSI/ISO standards define three track locations for the magnetic stripe on credit/financial cards. The tracks are 0.110" (0.279 cm) wide, with Track 1 closest to the card edge. Each track is utilized to store specific data types. Custom cards may specify the number of tracks and the data types stored on those tracks.

Customization of tickets presents disadvantages when modifications or updates of automatic fare collection (AFC) equipment is required since each custom ticket requires a custom-designed ticket processor. In addition, the mechanical structure of the ticket processor must be considered for each installation as the mechanism of the ticket processor may vary, not only between different transit authorities, but also may vary between different automatic fare collection equipment of the same transit authority. As a result, each custom ticket reader requires separate parts inventory for both the mechanical and electrical systems.

Therefore, a need remains for a universal ticket processor, reader/writer, which may be configured for all types of magnetically encoded tickets currently used in fare collection systems throughout the world.

SUMMARY OF THE INVENTION

It is an advantage of the present invention to provide a universal ticket transport that may be configured to read from and write to many types of magnetically encoded tickets currently used in fare collection systems throughout the world.

It is another advantage to provide a ticket transport that can process a range of ticket thicknesses.

Still another advantage is to provide a universal ticket transport having a mechanical insertion interface and automated movement for tickets presented at a range of different angles into and exiting from the mechanism.

It is yet another advantage to provide a control processor having analog to digital interfaces and control logic for operating the transport mechanisms locally and communicating data through a serial interface to a host system.

Another advantage of the present invention is to provide a shaft encoder and motor interface which reads from and writes to a variety of cards of differing bit densities.

In the exemplary embodiment of the present invention the Universal Ticket Transport (UTT), also referred to herein as "the transport", is configurable for all types of magnetically encoded tickets currently used in automatic fare collection (AFC) systems throughout the world. The UTT may be configured for tickets conforming to the ISO standard format for credit card-sized tickets, as well as for other tickets having variations of center and offset magnetic stripes on the top face or on the bottom face of the ticket. The UTT of the exemplary embodiment reads from and writes to low and high coercivity magnetic media. Transport belt assemblies of the UTT allow tickets of various thicknesses, e.g., ranging from 0.006" to 0.011", to be accepted by the UTT. A mechanical interface of the UTT provides automated movement for tickets presented at a range of different angles into and exiting from the UTT. The UTT further includes a control processor printed circuit board that provides analog to digital interfaces for local operation and control of the UTT, and a serial interface to a host system for control of the data communication between the ticket and the host system.

A ticket is moved through the Universal Ticket Transport mechanism held between two belts. The UTT of the exemplary embodiment includes two belt assemblies, each having a set of belts. The belts are made from an elastic material and installed onto belt rollers in a stretched condition, so that tensioners are not required. The belt rollers are located at the ends and in the middle of the transport. Two rollers at each end of the UTT function as drive rollers for moving the sets of belts in a forward or reverse direction. The drive rollers are positioned onto shafts mounted in ball bearings located in side plates of the UTT. The drive rollers at the entrance end of the transport path are connected to a UTT or a host motor which provides the power input for the movement of the belts. For each drive roller there is a gear and timing pulley assembly mounted on the drive roller shaft. The two gears mesh to drive both drive rollers at the same speed and help prevent slippage of the ticket between the two belts. The timing pulley couples the drive from the motor via a timing belt. The gears are arranged to always mesh irrespective of the roller configuration positions. If the transport is used in an application where the drive is provided by a host motor, then a belt from that host mechanism is coupled to one of the pulleys.

The rollers in the middle of the transport provide the pinch to maintain a hold on the ticket. The middle rollers also shape the ticket to pass over the magnetic head assembly in the most optimum manner. The belt path of the exemplary embodiment is offset to one side of the transport and may be assembled in this position irrespective of the location of the magnetic head assembly. However, the belt assemblies and the magnetic head assembly of the exemplary embodiment may be arranged along a width of the UTT to accommodate a variety of magnetic stripe locations. The magnetic head type and position also are configured to suit the magnetic stripe position and coercivity for the ticket type that will be processed. The location and quantity of the heads is also dependent upon the application for the UTT mechanism. For a vending machine, i.e., a ticket issue application, one combined write and read head is used. For a ticket processor in a gate application, two heads are used, including a combined write and read head, and a verify read-only head. The gate mechanism uses the second verify head to provide verification during the encoding process, thus reducing the process time.

The transport rollers of the exemplary embodiment can be assembled to accommodate different angles for the tickets to enter and exit the transport. A variety of holes for the bearings that support the transport rollers are provided at each end of the transport side plates. The most suitable set of holes are selected during assembly at the factory. To provide the opposite configuration for top or bottom magnetic stripes, the transport is inverted, and the rollers and belts are installed into alternate sets of bearing holes to accommodate the entry and exit path angles.

The UTT of the exemplary embodiment has a local processor circuit, or controller, attached to the transport assembly. The controller has a microprocessor, motor and sensor driver interfaces, and magnetic read and write head circuitry. The controller provides local control to operate the transport mechanisms, and communicates data through a serial interface to a host system. Interface connections for additional sensors located in entry/exit bezels or other host equipment are provided to the local controller via cables and connectors.

The drive motor of the exemplary embodiment is a DC motor gearbox assembly that has an integral shaft encoder. The motor drives the transport in a forward or a reverse direction. The motor is mounted on a sub plate that can be located in various areas of the transport. The shaft encoder provides the timing pulse for the magnetic encoding and ticket positional information. Connectors and cables electrically connect the motor and shaft encoder to the controller.

In an exemplary method of the present invention, the UTT is configured with write/read heads above a transport assembly for cards having a top stripe, and below a transport assembly for tickets having a bottom stripe. A patron inserts a ticket "face-up" into an entry bezel. A bezel entry sensor determines whether the ticket is valid and properly inserted. The accepted ticket continues into the transport passed a write entry sensor to initiate the read function of a read/write magnetic head. The ticket travels over the read/write head until completely read. The transport belt then reverses direction, and the ticket moves back over the read/write head. The transport belt then reverses to advance the ticket for encoding using the read/write head. The ticket is operated upon in a write-only capacity on the first magnetic read/write head. As the ticket moves forward over the verify head, the verify process is initiated simultaneously on the verify head. A verify exit sensor indicates that the ticket verify process is complete. The ticket moves out of the transport through the exit bezel to a point where the ticket is no longer in the belt pinch at position. A bezel exit sensor indicates that the ticket has exited the Universal Ticket Transport.

BRIEF DESCRIPTION OF THE DRAWINGS

The present invention will be better understood from the following detailed description of a preferred embodiment of the invention, taken in conjunction with the accompanying drawings in which like reference numerals refer to like parts and in which.

DETAILED DESCRIPTION OF THE INVENTION

The following detailed description utilizes a number of acronyms which are generally well known in the art. While definitions are typically provided with the first instance of each acronym, for convenience, Table 1 below provides a list of the acronyms and abbreviations and their respective definitions.

TABLE 1

| ACRONYM | DEFINITION |
| --- | --- |
| A/D | Analog-to-Digital |
| ADC | Analog-to-Digital Converter |
| AFC | Automatic Fare Collection |
| High C | 2750 +/− 20% Oersteads |
| ips | Inches per second |
| Low C | 300 +/− 20% Oersteads |
| PCB | Printed Circuit Board |
| PLL | Phase Locked Loop |
| UTT | Universal Ticket Transport Assembly |

Figure 1:
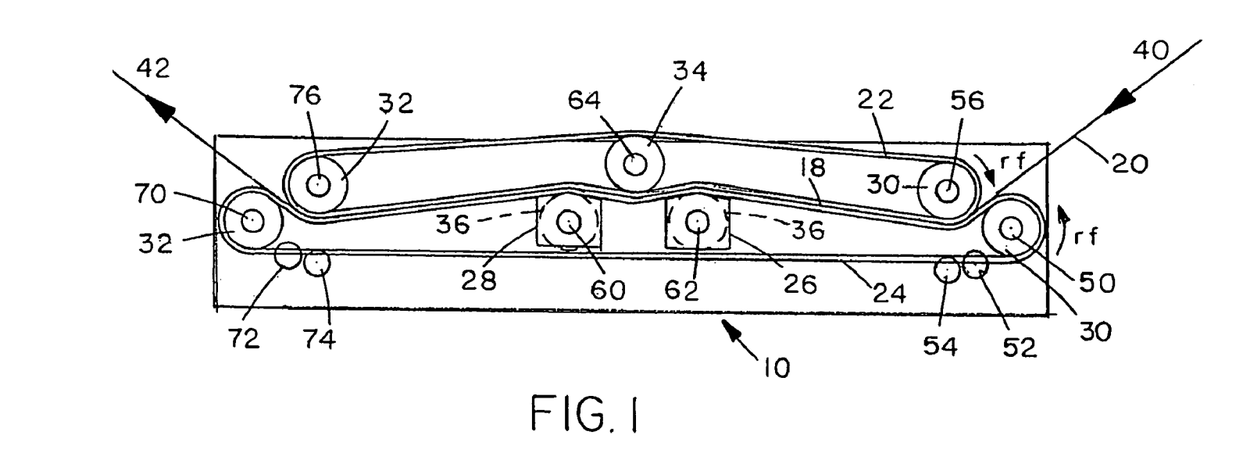
FIG. 1 is a Universal Ticket Transport of a preferred embodiment for bottom face magnetic stripe locations.
Figure 6:
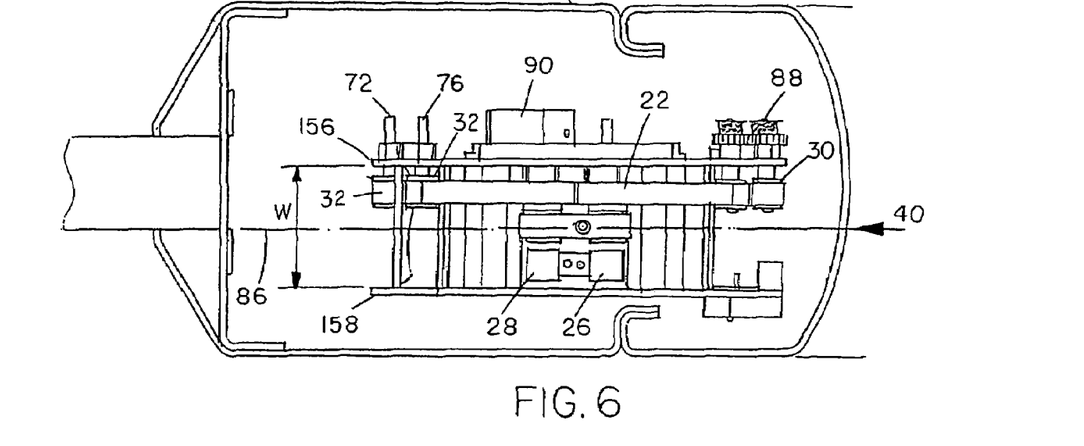
FIG. 6 shows a top view of a single belt configuration of the Universal Ticket Transport installed in a gate.
Figure 7:
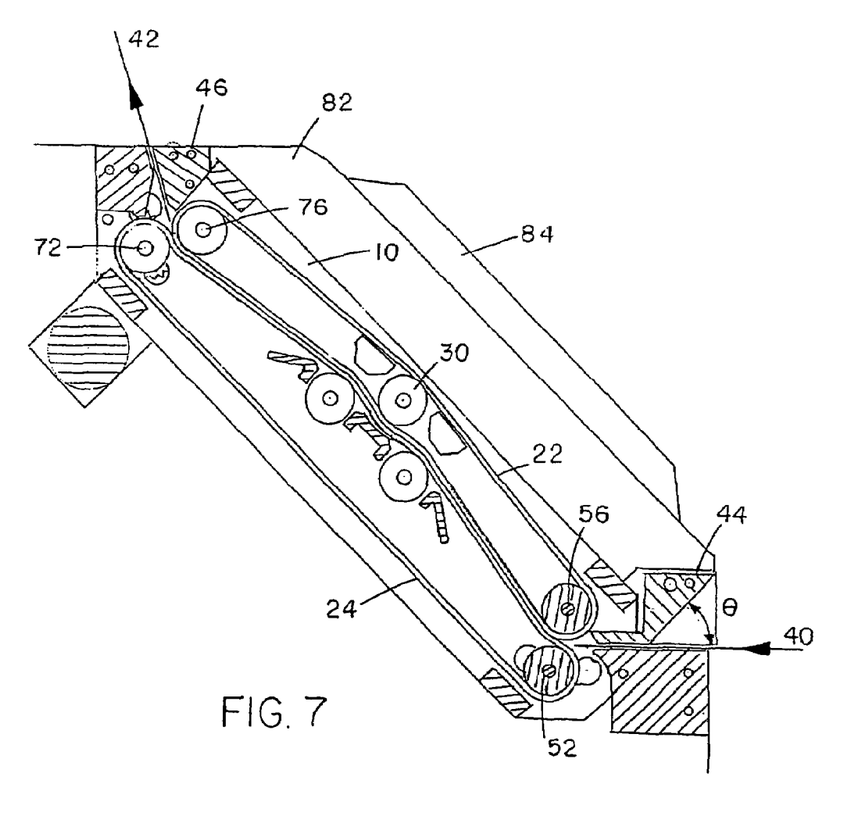
FIG. 7 shows a side view of a single belt configuration of the Universal Ticket Transport installed in a gate.
Figure 8:
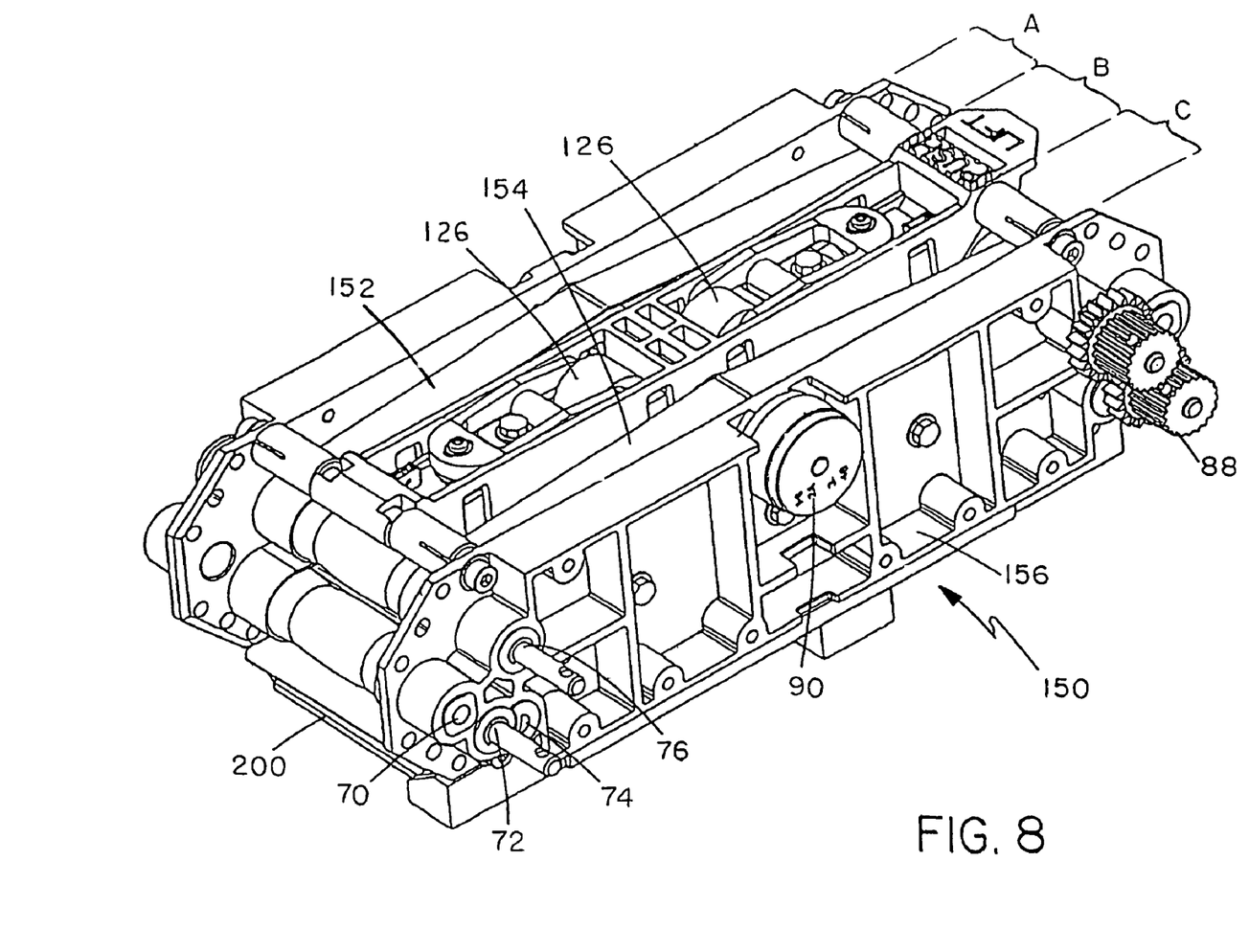
FIG. 8 is a perspective drawing of a back view of a dual belt Universal Ticket Transport assembly of a preferred embodiment.
Figure 9:
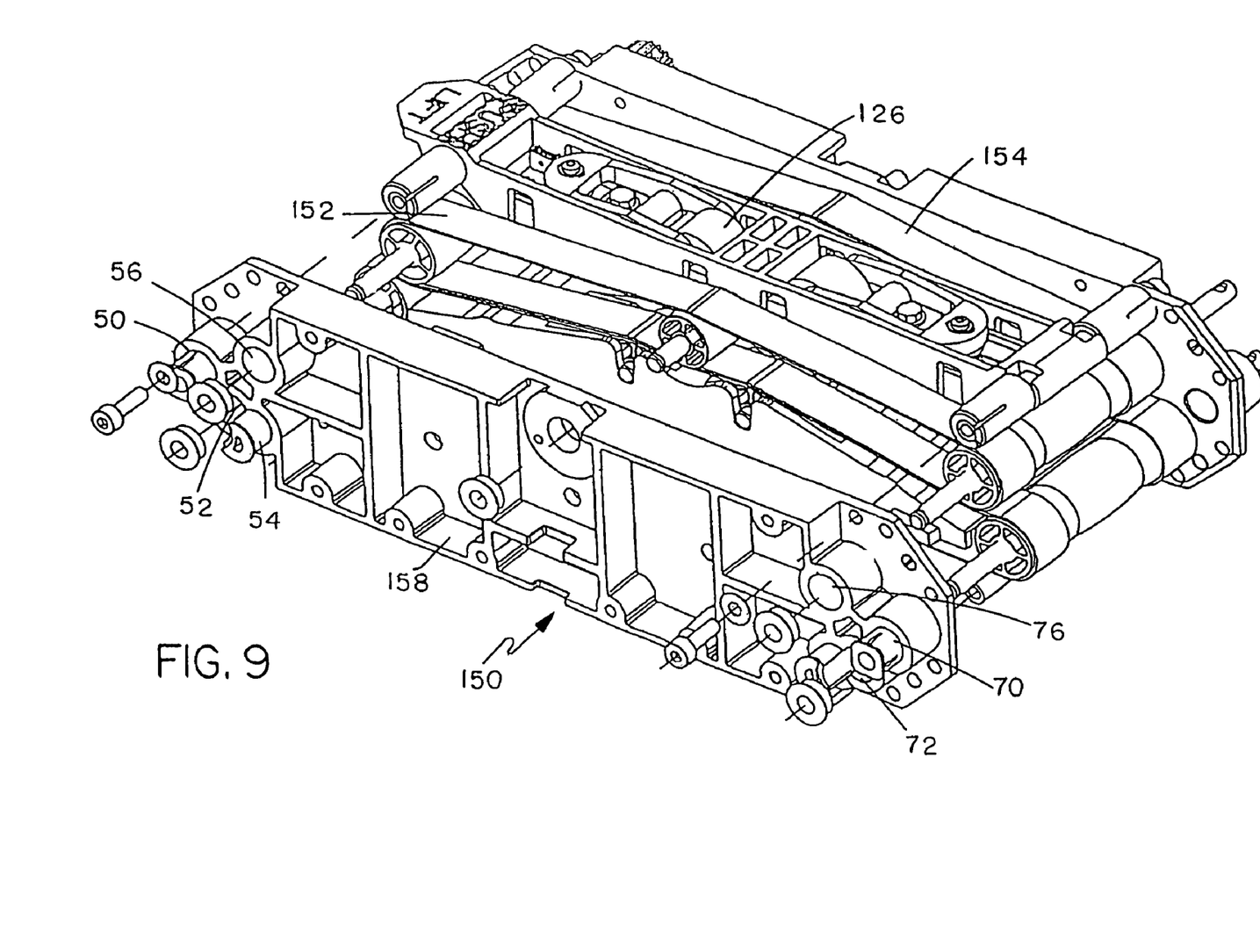
FIG. 9 is perspective partial exploded view of a front view of a dual belt Universal Ticket Transport assembly of a preferred embodiment.

FIG. 1 illustrates a partial view of a Universal Ticket Transport (UTT) 10, also referred to as "the transport", of a preferred embodiment of the present invention. A ticket 20 moves through the transport belt path 18 of the transport mechanism 10 between two belts 22, 24. The UTT of a preferred embodiment is a dual-belt UTT 150 having a first set of belts 152 and a second set of belts 154 of belt assemblies A and C, respectively, as shown in FIGS. 8 and 9. In an alternate embodiment, as shown in FIGS. 6 and 7, a single set of belts 22, 24 hold the ticket 20 in place as it travels through the transport 10. The dual belt UTT 150 of the preferred embodiment keeps the ticket 20 straight in the transport, and provides a better grip of the ticket 20.

Referring again to FIG. 1, the belts 22, 24 are made from an elastic material, and are installed onto the rollers 30, 32, 34, 36 in a stretched condition to eliminate the need for belt tensioners. This belt configuration allows for varying thicknesses of tickets, including plastic tickets that are typically 0.010 inches (0.25 mm) thick, and paper tickets that are typically 0.007 inches thick (0.18 mm). The rollers 30, 32, 34, 36 are located at the ends and at the middle portion of the transport 10. The rollers 30, 32 at each end of the transport belt path 18 are drive rollers that are attached to shafts 50, 56, 70, 76 mounted in ball bearings. The drive roller assemblies provide the power input for the forward rotation rf, or the reverse rotation rr, that moves the ticket 20 through the transport path 18. The center rollers 34, 36 provide the pinch to maintain a hold on the ticket 20. The center rollers 34,36 also shape movement of the ticket 20 to ensure that it passes over the magnetic head assembly 26, 28 in the most optimum manner. As shown in FIGS. 6 and 8, the belts 22, 152, 154 of both the single belt and dual belt transports 10, 150 may be offset to one side of the UTT 10, 150 to provide sufficient space for the various positions of the magnetic heads 26, 28.

The magnetic head 26, 28 type and position is configured during manufacture to suit the magnetic stripe position and coercivity for the ticket type 20 that will be processed at a particular gate 82, shown in FIG. 7, or other automatic fare collection (AFC) mechanisms. The location of the magnetic heads 26, 28 can also be changed in the field, if required, as the transport 10 is designed for easy reconfiguration. The location and quantity of the magnetic heads 26, 28 also is dependant upon the application for the UTT mechanism. For a ticket processor in a gate application 82, two magnetic heads are used, one combined write and read head 26, and a verify (read head) 28. The ticket gate mechanism utilizes the second verify head 28 to provide verification during an encoding process and to reduce processing time as discussed further below. The heads 26, 28 are always populated in the same half of the transport assembly 10.

As shown in FIGS. 8 and 9, the preferred embodiment of the UTT 150 also includes head pressure rollers 126 which are located on top of each magnetic head assembly 26, 28 to ensure that the ticket is firmly held in contact with the magnetic poles in the magnetic head assembly 26, 28. Referring again to FIG. 1, the rollers 36 are flexible to allow a ticket 20 to pass between the heads 26, 28 and the rollers 34, 36 to force the ticket 20 to contact the head 26, 28 without causing ticket slippage in the transport path 18. The rollers 30, 34, 36 also are flexible enough to allow a damaged or folded ticket 20 to pass through the transport path 18. The magnetic heads 26, 28 of a preferred embodiment must operate on magnetic stripes to a maximum coercivity of 3000 Oersteads. However, the magnetic heads 26, 28 must not produce residual magnetism that alters low coercivity tickets, for example, 300 Oersteads.

FIG. 6 illustrates the design of the mechanical assembly of the single belt set UTT 10 which provides alternate positions for center or offset stripes. The illustrated UTT 10 is configured for a bottom face magnetic stripe that is offset to the left of a center line 86 relative to the insertion direction 40. For other magnetic stripe locations, the magnetic heads 26, 28 can be located at any position across the width, W, of the transport 10. The dual belt UTT 150 may also be configured for various magnetic stripe locations by rearranging the belt assemblies A, C and the magnetic head assemblies B, as shown in FIG. 8.

Figure 5:
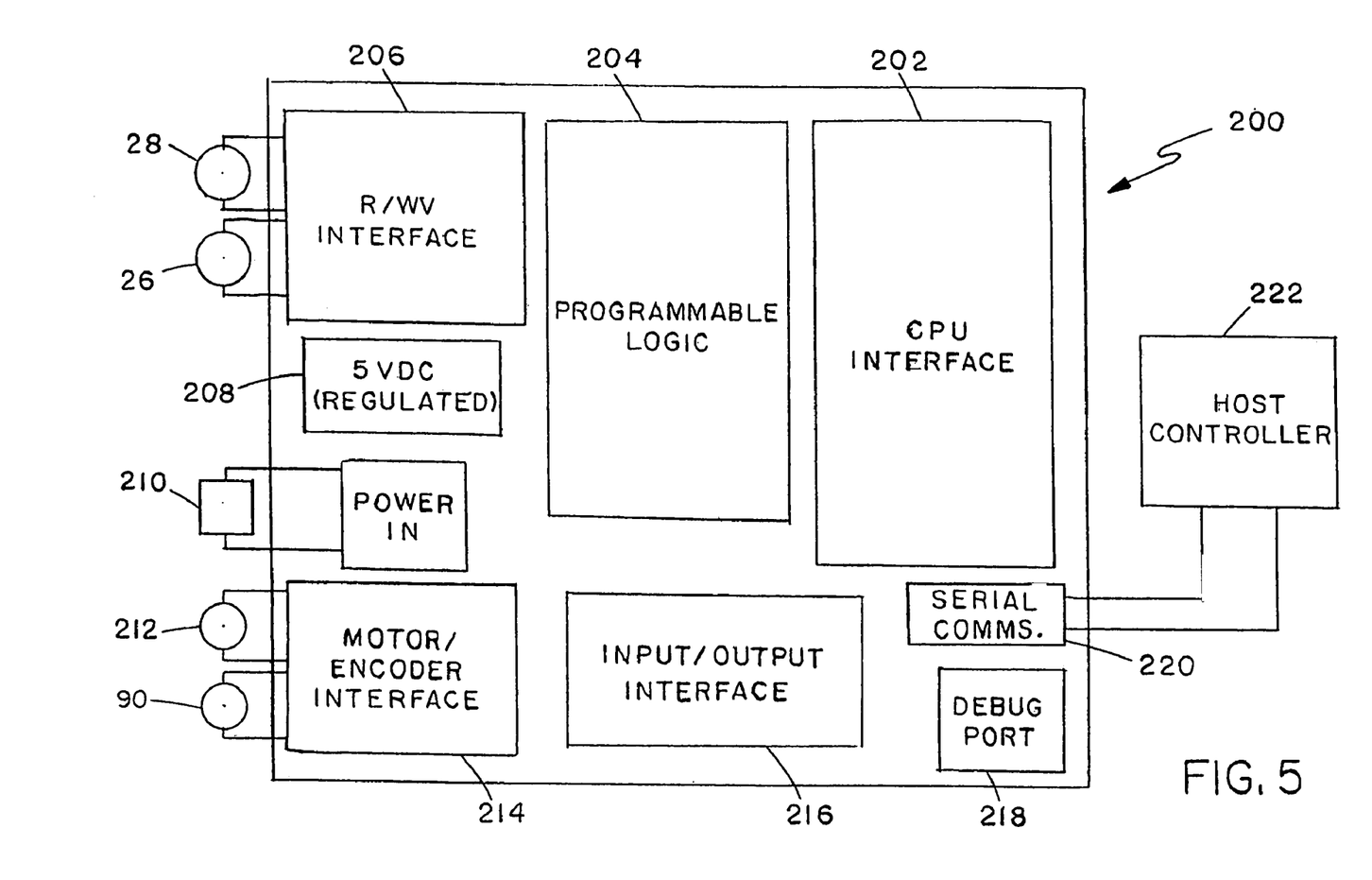
FIG. 5 is a block diagram of the Universal Ticket Transport processor circuit.

Continuing with FIGS. 6 and 7, at each end of the transport the drive rollers 30, 32 are mounted onto shafts 52, 56, 72, 76 that protrude through bearings to a non-ticket side 156 of the UTT assembly 10. For each entry drive roller 30 there is a gear and timing pulley assembly 88 mounted on the entry drive roller shafts 52, 56. The two gears 88 mesh to drive both entry drive rollers 30 at the same speed and help prevent slippage between the two belts. A timing pulley (not shown) couples the drive from a motor 212, as illustrated in FIG. 5, utilizing a timing belt (not shown). The gears 88 are arranged to always mesh irrespective of the selected roller 30 configuration. The motor drive belt can be coupled to any of the pulleys. If the transport 10 is used in an application where the drive is provided by a host motor, then a belt from that host mechanism may be coupled to one of the pulleys.

As shown in FIG. 1, the Universal Ticket Transport 10 of the preferred embodiment provides a variety of holes for the bearings, i.e., shafts, that support the transport rollers 30, 32 at each end of the transport 10. The variety of holes allow the entry and exit drive rollers 30, 32 to be assembled to accommodate different entry and exit angles 40, 42 for the tickets to enter and exit the transport 10. The most suitable set of holes for a particular installation of the UTT 10 are selected during assembly at the factory. FIG. 1 illustrates a downward entry angle 40 for a ticket 20. The downward angle results from the placement of the entry drive rollers 30 on shafts placed in hole positions 50 and 56, with the upper belt 22 placed around the roller corresponding to hole 56, and the lower belt 24 placed around the roller corresponding to hole 50. An upward exit angle 42 is achieved by placing the exit rollers 32 and shafts in holes 70 and 76. FIGS. 8 and 9 illustrate the exit holes 70, 72, 74, 76 and the entry holes 50, 52, 54, 56 that are part of side plates 156, 158 of the dual belt UTT.

Figure 3A:
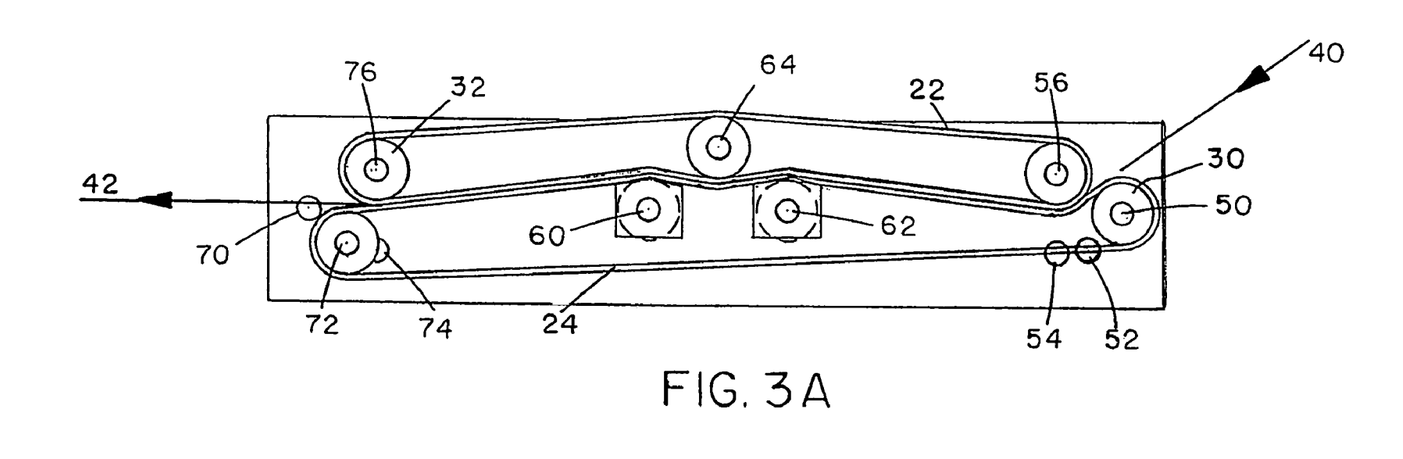
FIG. 3a shows an alternate downward entry angle and straight exit transport configuration.
Figure 3B:
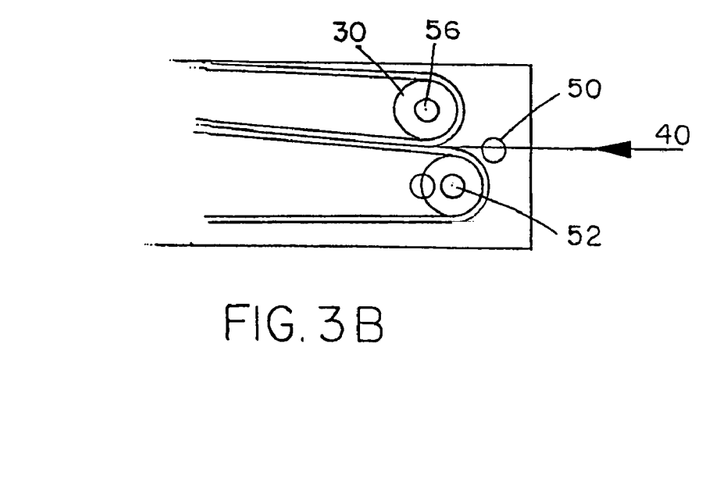
FIG. 3b illustrates roller positions for a straight entry transport configuration.
Figure 3C:
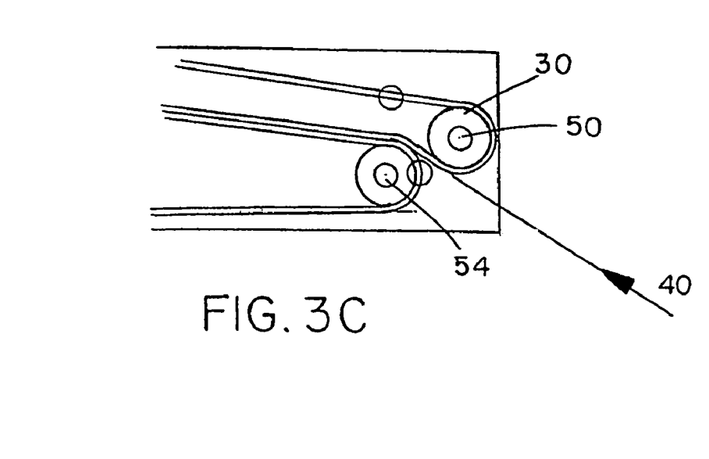
FIG. 3c illustrates roller positions for an upward entry angle transport configuration.

FIGS. 3a, 3b, and 3c illustrate other configurations for placement of rollers 30, 32 to provide various entry and exit angles 40, 42. In FIG. 3a, a straight exit angle 42 is achieved by placement of the shaft and exit roller 32 of the upper belt 22 in hole 76, and placement of the shaft and exit roller 32 of the lower belt 24 in hole 72. FIG. 3b illustrates a straight angle entry 40 by placing the shafts and rollers 30 of the upper and lower belts in holes 56 and 52, respectively. A upward entry angle 40 of FIG. 3c is achieved by placement of the shafts for the upper belt roller in hole 50, and for the lower belt roller in hole 54. Obviously, other combinations, not shown, for exit and entry angles 40, 42 are possible by simply reconfiguring the placement of the shafts and rollers 30, 32 at the ends of the transport belt path 18.

Figure 2:
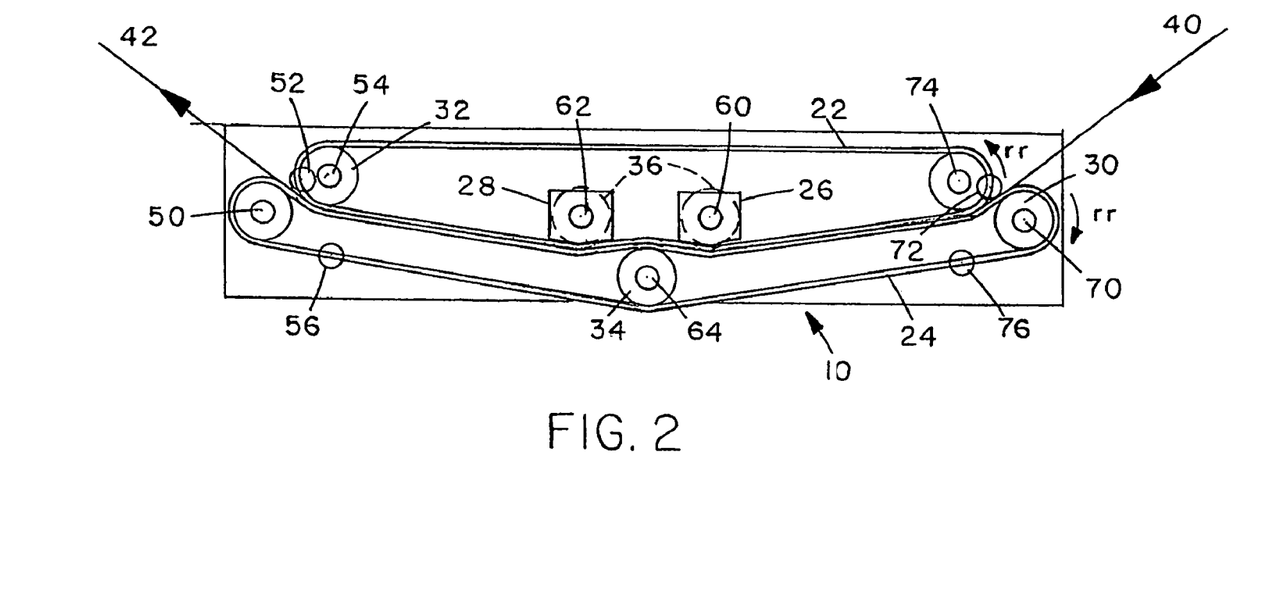
FIG. 2 is a Universal Ticket Transport for upper face magnetic stripe locations.

The UTT illustrated in FIG. 1 is configured such that the magnetic heads 26, 28 face upward for processing tickets 20 having magnetic stripes on the bottom of the tickets 20. The lower belt 24 is stretched around the center rollers 36 on shafts 60, 62 adjacent, i.e., in line with, the magnetic heads 26, 28. The upper belt 22 is stretched around center roller 34 on shaft 64. FIG. 2 illustrates the configuration for processing tickets 20 having magnetic stripes on the top of the tickets 20. This configuration is achieved by simply rotating the UTT assembly so that the read/write and verify heads 26, 28 face downward, and then orientating the pulleys and gears as required. The upper belt 22 is stretched around the center rollers 36 adjacent the magnetic heads 26, 28. The upper belt 24 is stretched around center roller 34 on shaft 64. The proper entry angle 40 and exit angle 42 may be configured by choosing an appropriate combination of entry holes 70, 72, 74, 76 and exit holes 50, 52, 54, 56. Thus, the combination of the rotation of the UTT mechanical assemblies and the placement of the drive belts 24, 26 and magnetic head 26, 28 assemblies allows the UTT 10 to be configured for a variety of magnetic stripe tickets utilizing the same UTT components and subassemblies.

Figure 4:
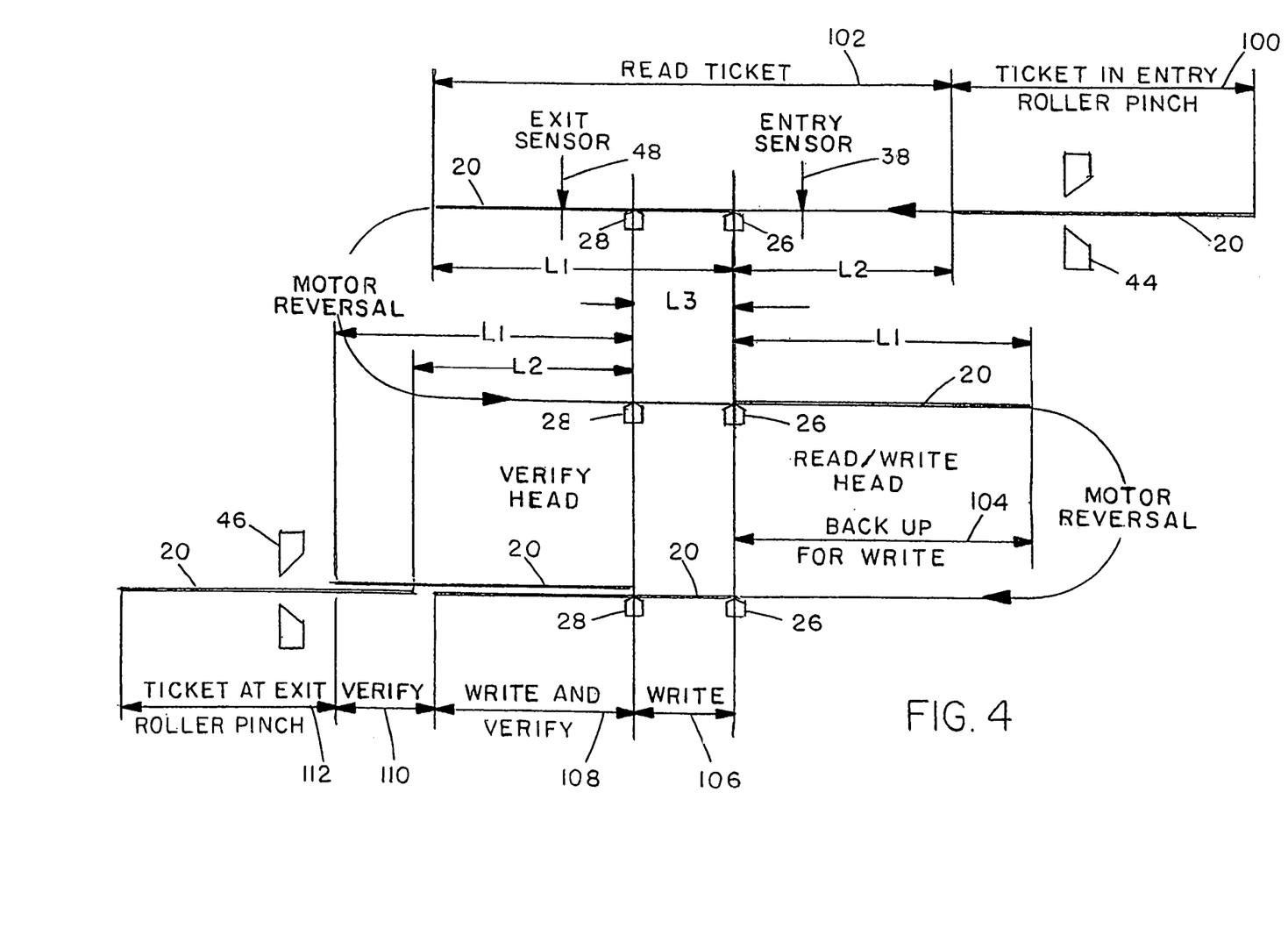
FIG. 4 is an illustration of a method of the preferred embodiment for reading, writing, and verifying a ticket for a gate application.

FIG. 4 illustrates a ticket processing diagram of a preferred embodiment of the Universal Ticket Transport 10 for a gate application which functions to read/write and to verify a ticket. At position 100, the ticket is inserted through the entry bezel 44 and is pinched between the belts (not shown) in the entry pinch rollers (not shown). When the patron releases the ticket 20, the transport belts draw the ticket 20 into the transport 10. The ticket 20 moves from the initial pinch position 100 passed an bezel entry sensor (not shown). A bezel entry sensor (not shown) may be used to determine if the ticket 20 has been inserted correctly. If the ticket is not inserted correctly, the belt direction is reversed rr, and the ticket 20 is pushed back through the entry bezel 44.

The accepted ticket 20 continues into the transport passed a write entry sensor 38 which is utilized to initiate the read function of the read/write magnetic head 26. The ticket 20 travels over the read/write head 26 until completely read. The read ticket position 102 of a first embodiment requires a length area of L1+L2, where L1 is the length of a typical ticket. The transport belt, i.e., the motor 212, then reverses direction, and the ticket 20 is moved back over the read/write head 26, as shown by position 104. The maximum distance required to reverse the ticket over the read/write head is a complete ticket length, L1. The transport belt then reverses to advance the ticket 20 for encoding. As the ticket 20 advances through position 106, the ticket 20 is operated upon in a write-only capacity on the first magnetic head 26. In position 108, the write continues on head 26, and the verify process is initiated simultaneously on the verify head 28. In the verify-only position 110, the write has completed, and the verify continues to the end of the encoding on the magnetic stripe of the ticket 20. An exit sensor 48 indicates when the ticket trailing edge has moved beyond the magnetic head. The ticket is moved out of the transport through the exit bezel 46 to the point where it is no longer in the belt pinch at position 112. A bezel exit sensor (not shown) may be used to indicate that the ticket is out of the transport 10.

As illustrated in FIG. 4, the worst case transport belt length required for the read, the write, and the verify process for the Universal Ticket Transport 10 is two card lengths L1 in addition to a distance L3 between the read/write head 26 and the verify head 28. The encode length is typically less than the length L1 of the ticket 20 since the entire magnetic strip will not be usable for reading or writing. Distance L3 in the preferred embodiment is 1.13 inches (2.87 cm). Distance L3 is selected to provide a sufficient separation between the magnetic heads to eliminate cross talk during the simultaneous write and verify processes. Distance L3 also is selected to provide a physical separation between the rollers which is required to allow the ticket to flex so that it will remain in contact with the magnetic heads. L2 is chosen in a range such that the ticket is fully into the UTT prior to the magnetic encoding processing. This ensures jitter free operation of the process. It should be appreciated that other embodiments of the process of FIG. 4 are not shown, e.g., for other applications where it is only necessary to write and verify the ticket contents.

The UTT 10 includes an entry sensor 38 and an exit sensor 48 which are located in the UTT transport path 18. The sensors 38, 48 of the preferred embodiment are optically transmissive interrupter types of sensors. Other sensors for ticket bezel entry/exit information (not shown) are mounted in the host equipment, e.g., the ticket gate. The sensors 38, 48 are connected to the UTT processor circuit 200, shown in FIG. 5, via cables and connectors.

The UTT transport 10 of an alternate embodiment of the present invention can operate with only one compound read/write head assembly 26 where the ticket is reciprocated back and forth over the head completing the read, write and verify functions with separate cycles. However, to reduce processing time, the second head 28 is added to provide a verify capability while the ticket 20 is being written to by the first head 26. This configuration of the UTT 10 saves one complete reciprocation of the ticket 20. This is especially advantageous in a gate application 82 where high-speed operation is critical. The information shown below is for the dual head UTT 10, 150 of the preferred embodiment, which is the worst-case design requirement, demanding the most power and processing capability. Slower process times and additional reciprocations may be added in alternate embodiments of the invention without requiring hardware design changes.

The UTT 10 of the preferred embodiment is designed to process patron tickets in less than 0.5 seconds in a gate application, and 1.0 second in a ticket vending machine application. The UTT 10 is designed to be a flexible solution to a wide array of ticket formats and densities. In a first embodiment of the invention, with a typical card having a length of 3.38 inches (8.58 cm), and where L1=3.38 inches (8.58 cm), L2=2.5 inches (6.35 cm), and L3=1.13 inches (2.87 cm), then the total distance traveled by the card is 16.27 inches (41.33 cm). The transport speed then is calculated within a given allowable processing time as follows:

Total distance traveled=16.27 inches;
Ticket reversal time=0.04 seconds each (estimated)=0.08 seconds;
Total processing time available=0.5 seconds;
Total time available for processing excluding reversals=0.42 seconds;
Transport speed required=16.27/0.42=38.74 inches per second (ips);
Round up Transport speed=40 ips;
20% design margin in the transport speed=48 ips (1.22 meters/see).

Referring to FIG. 5, the electrical system of the UTT is composed of a printed circuit board (PCB), or processor circuit 200, and is attached to the transport assembly 10, 150. As shown in FIG. 8 of the dual-belt UTT 150, the printed circuit board 200 is located on the underside of the UTT 150. The UTT processor circuit 200 of a preferred embodiment has a number of subsystems including a microprocessor controller, e.g., a central processing unit (CPU) 202 and programmable logic 204, a motor/encoder interface 214 connected to a bidirectional transport motor 212 and shaft encoder 90, magnetic read and write circuitry 206 connected to the read/write and verify magnetic heads 26, 28, and an input/output interface 216. The UTT 10 of a preferred embodiment operates on a 24 v DC power supply 210, which is utilized to generate a regulated 5 VDC power supply 208 for the processor circuitry 202, 204. A debug port 218 is provided for debug activity through an RJ45 connector.

The UTT processor circuit 200 provides local control for the transport 10 and communicates data through a serial interface 220, e.g., an RS422/485 interface, to a host controller 222. The UTT processor circuit 200 performs the functions of controlling the bi-directional motor 212, accepting shaft encoder inputs up to 16 kHz, driving a solenoid output, reading emitter receiver paired sensor inputs, reading and encoding low and high coercivity tickets 20, and communicating ticket processing information with the host controller 222. The UTT process circuit 200 provides only mechanical functionality for the UTT 10, 150. All ticket processing related activities, such as fare table analysis and encoded data, is provided by the host system 222.

The input/output interface 216 includes inputs for additional sensors located in the entry and exit bezels 44, 46, or for other host equipment signals. The sensors of the preferred embodiment of the UTT 10 include a sensor (not shown) indicating a ticket present at entry bezel, a orientation/alignment hole (not shown), a write entry sensor 38, a verify exit sensor 48, an exit bezel sensor (not shown), and a sensor indicating that the ticket 20 is completely out of transport path (not shown). The preferred embodiment of the UTT processor circuit 200 also includes an on-board temperature sensor to provide thermal detection capability through the use of an analog to digital (ND) converter which is accurate to +/−5 degrees C. A watchdog circuit is included on the processor circuit board 200 of the preferred embodiment to ensure that the write head driver is not stuck in the "on" state. The processor 202, 204 digital outputs include a diverter solenoid signal, a system good indicator, motor control outputs for direction and enable control, a read/verify selection enable, a transmit enable for RS485 communications with the host controller 22, and select lines for bit density and motor speed settings.

Referring to FIGS. 5, 6 and 8, the drive motor assembly consists of a permanent magnet DC brush motor 212 and a spur or planetary type gearbox assembly 88. The DC motor 212 drives the transport in either direction, rf and rr. The motor 212 of the preferred embodiment includes an integral, i.e., motor mounted, shaft encoder 90. The motor/encoder interface 214 includes a shaft encoder/phase locked loop electronics combination that is used to provide the clock input for the write head 26 during magnetic encoding, and to generate a count for the read data cell times. The shaft encoder 90 also is used to provide ticket positional information. The shaft encoder 90 is mounted onto the side of the transport, as shown in FIGS. 6 and 8, where it is driven by a pulley (not shown) directly contacting the ticket belt next to the magnetic write head 26.

Mounting the shaft encoder 90 in the transport 10, 150 provides the best compliance with the motion of the ticket 20 minimizing jitter caused by belt elasticity and timing belt cogging. The shaft encoder 90 mounting also provides for embodiments of the invention where the UTT is driven from the host equipment 222 and does not have it's own motor. The pulses per revolution output of the shaft encoder 90 is matched for the best frequency for the phase locked loop (PLL) multiplier/divider. The PLL and associated control software generates the correct magnetic write data frequency by appropriately multiplying and then dividing the shaft encoder output. Connectors and cables electrically connect the motor 212 and shaft encoder 90 to the UTT processor circuit 200.

FIGS. 6 and 7 illustrate a single belt UTT 10 installed in a transit system fare gate 82. The fare gate 82 includes the UTT 10 magnetic stripe reader, as well as a contactless card reader 84. The entry bezel 44 provides an angled 0 entry, such that the angled placement of the UTT 10 necessitates a downward entry angle 40. The downward entry angle 40 and an upward exit angle 42 accomplished by placing the entrance roller shafts in holes 52 and 56, and the exit roller shafts in holes 72 and 76. In addition, the ends of the transport 10 are adaptable to interface to the host gate equipment 82 utilizing entry and exit bezels 44, 46 that provide the smooth transition for tickets into and out of the UTT mechanism 10. It should be appreciated that the universality of the ticket transport 10 allows the ticket transport 10 to be installed in gates and ticketing machines of various configurations.

FIGS. 8 and 9 illustrate a front and back view of a dual belt UTT 150 of a preferred embodiment of the present invention. The use of dual belt pairs 152, 154 of belt assemblies A, C maintain a better grip of the ticket 20, and keeps the ticket 20 straight in the transport belt path 18. The two belt assemblies A, C and the magnetic head assembly B may be rearranged to accommodate the magnetic stripe configuration utilized at a particular ticket processing mechanism, i.e., a automatic fare collection device. The dual belt UTT may be configured for ticket entry and exit angles by the appropriate placement of the rollers in holes 50, 52, 54, 56, 70, 72, 74, 76.

In any of the embodiments of the UTT 10, 150, a solenoid-activated diverter (not shown) may be installed at one end of the transport 10, 150. The location of the diverter is selected to suit the configuration of the exit rollers 32. The diverter and associated guides enable a ticket 20 to be routed to another transport mechanism or into a capture bin (not shown).

The preferred embodiment of the Universal Ticket Transport 10, 150 utilizes injection molded plastics for the majority of the parts. The side plates 156, 158 are molded from a wear resistant plastic with ticket guides and component mounting features molded in. All of the pulleys are plastic and are mounted on stainless steel shafts 50, 56, 72, 76. The drive rollers 30, 32 at either end of the transport 10 are supported by ball bearings mounted in the side plates 156, 158. The idler rollers 32 in the middle of the transport 10 are molded from self-lubricating plastic that enables them to run on the stainless steel shaft. The belts 22, 24, 152, 154 are made from an elastomer material, and the head pressure rollers 126 are made from foamed elastomer.

Although a preferred embodiment of the invention has been described above by way of example only, it will be understood by those skilled in the field that modifications may be made to the disclosed embodiment without departing from the scope of the invention, which is defined by the appended claims.

What is claimed is:

1. A ticket reader/writer for processing a plurality of tickets in an automatic fare collection device, each of the plurality of tickets having at least one magnetic stripe located on at least one of a ticket top surface or a ticket bottom surface, the ticket reader/writer comprising:
   an upper entrance roller and a lower entrance roller being adapted to accept a ticket of the plurality of tickets at a predetermined entry angle;
   an upper exit roller and a lower exit roller of a plurality of rollers, adapted to eject the ticket at a predetermined exit angle;
   an upper belt stretched around the upper entrance roller and the upper exit roller; and
   a lower belt stretched around the lower entrance roller and the lower exit roller, wherein the upper belt and the lower belt form a transport path therebetween for the ticket;
   a drive mechanism for rotating at least one of the plurality of rollers in a forward direction to move the ticket though the transport path; and
   at least one magnetic head for reading from and writing to the ticket, at least one magnetic head positioned along a width of the ticket reader/writer corresponding to a placement of the at least one magnetic stripe of the ticket, the at least one magnetic head comprising:
   a first magnetic head for reading from and writing to the ticket, wherein the drive mechanism moves the ticket over the first magnetic head to complete a read process, rotates at least one of the plurality of rollers in a reverse direction to move the ticket back over the first magnetic head after the read process, then moves the ticket in the forward direction to initiate a write process using the first magnetic head; and
   a second verify-only magnetic head for performing a verify process of the ticket.

2. The ticket reader/writer as in claim 1, wherein the verify process is at least partially simultaneous with the write process.

3. The ticket reader/writer as in claim 1, further comprising:
   at least one upper center roller positioned between the upper entrance roller and the upper exit roller and encompassed by the upper belt; and
   at least one lower center roller positioned between the lower entrance roller and the lower exit roller and encompassed by the lower belt, the at least one upper center roller and the at least one lower center roller positioned relative to one another to maintain a predetermined pinch pressure holding the ticket.

4. The ticket reader/writer as in claim 1, further comprising at least one head pressure roller positioned on top of a corresponding one of the at least one magnetic head, and configured to maintain contact between the ticket and the at least one magnetic head as the ticket passes the at least one magnetic head.

5. The ticket reader/writer as in claim 1, further comprising a shaft encoder coupled to the drive mechanism, the shaft encoder utilized for providing a clock input for the at least one magnetic head and for providing ticket positional information of the ticket.

6. The ticket reader/writer as in claim 1, wherein the drive mechanism is configured to move the ticket over the at least one magnetic head to complete a read process, rotate at least one of the plurality of rollers in a reverse direction to move the ticket back over the at least one magnetic head after the read process, then move the ticket in the forward direction to initiate a write process using the at least one magnetic head.

7. The ticket reader/writer as in claim 1, wherein the at least one magnetic head can be selectively positioned to read one of a top surface magnetic stripe or a bottom surface magnetic stripe.

8. A method of processing a ticket in a read/write mechanism in an automatic fare collection device, the method comprising:
   providing at least one side plate in the read/write mechanism for supporting at least one belt assembly, the at least one belt assembly having a plurality of rollers in a plurality of holes of the at least one side plate, the plurality of rollers comprising an upper entry roller, an upper exit roller a lower entry roller, and a lower exit roller;
   providing an upper belt stretched around the upper entry roller and the upper exit roller;
   providing a lower belt stretched around the lower entry roller and the lower exit roller, wherein the upper belt and the lower belt provide a transport path therebetween for the ticket;
   providing a magnetic head assembly comprising a first magnetic head adjacent to the transport path;
   driving the upper belt and the lower belt in a first direction to carry the ticket over the first magnetic head to read from the ticket; and
   driving the upper belt and the lower belt in a reverse direction to back up the ticket over the first magnetic head;
   driving the upper belt and the lower belt in the first direction to carry the ticket over the first magnetic head to write to the ticket;
   the upper exit roller and the lower exit roller being adapted to eject the ticket from the automatic fare collection device between the upper exit roller and the lower exit roller at the desired exit angle;
   providing a shaft encoder and phase locked loop circuit; and
   utilizing the shaft encoder and phase locked loop circuit for the steps of:
   generating a clock input for the write head;
   generating a count for a plurality of read data cell times of the magnetically encoded stripe; and
   providing ticket positional information.

9. The method of claim 8, wherein the magnetic head assembly comprises a first magnetic head and a second magnetic head, further comprising the step of:
   verifying the ticket utilizing the second magnetic head, wherein the step of verifying the ticket is at least partially simultaneous with the step of writing to the ticket.

10. The method of claim 8, wherein the magnetic head assembly is configured to be repositionable adjacent to the transport path for processing a ticket having one of a bottom face magnetic stripe or a top face magnetic stripe.

* * * * *